US010760199B2

(12) United States Patent
Cannon et al.

(10) Patent No.: US 10,760,199 B2
(45) Date of Patent: Sep. 1, 2020

(54) HOUSEHOLD APPLIANCE WITH A BULK DISPENSER

(71) Applicant: WHIRLPOOL CORPORATION, Benton Harbor, MI (US)

(72) Inventors: Marcus A. Cannon, Saint Joseph, MI (US); Eric A. Gallagher, Kalamazoo, MI (US); Jenn-Yeu Nieh, Saint Joseph, MI (US); Bruno T. Ramasco, Stevensville, MI (US); Mary E. Zeitler, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 180 days.

(21) Appl. No.: 15/835,560

(22) Filed: Dec. 8, 2017

(65) Prior Publication Data

US 2019/0177901 A1 Jun. 13, 2019

(51) Int. Cl.
| | |
|---|---|
| *D06F 39/02* | (2006.01) |
| *G01F 11/38* | (2006.01) |
| *G01F 11/02* | (2006.01) |
| *G01F 11/16* | (2006.01) |
| *D06F 13/00* | (2006.01) |
| *D06F 37/30* | (2020.01) |
| *D06F 37/40* | (2006.01) |
| *D06F 37/38* | (2006.01) |
| *D06F 39/08* | (2006.01) |
| *D06F 33/00* | (2020.01) |
| *D06F 34/28* | (2020.01) |
| *D06F 23/04* | (2006.01) |
| *D06F 39/12* | (2006.01) |

(52) U.S. Cl.
CPC ............ *D06F 39/028* (2013.01); *D06F 13/00* (2013.01); *D06F 33/00* (2013.01); *D06F 34/28* (2020.02); *D06F 37/304* (2013.01); *D06F 37/38* (2013.01); *D06F 37/40* (2013.01); *D06F 39/085* (2013.01); *G01F 11/02* (2013.01); *G01F 11/16* (2013.01); *G01F 11/38* (2013.01); *D06F 23/04* (2013.01); *D06F 39/022* (2013.01); *D06F 39/088* (2013.01); *D06F 39/12* (2013.01)

(58) Field of Classification Search
CPC .................................................... D06F 39/028
See application file for complete search history.

(56) References Cited

U.S. PATENT DOCUMENTS

| | | |
|---|---|---|
| 5,176,297 A | 1/1993 | Mooney et al. |
| 6,327,729 B1 | 12/2001 | Wunderlich et al. |
| 6,398,081 B2 | 6/2002 | Bassi et al. |
| 6,401,499 B1 | 6/2002 | Clark et al. |
| 7,472,810 B2 | 1/2009 | Amir |

(Continued)

FOREIGN PATENT DOCUMENTS

| | | |
|---|---|---|
| BR | PI1101332 A2 | 5/2013 |
| BR | PI1101300 A2 | 5/2016 |
| EP | 1329188 A1 | 7/2003 |

*Primary Examiner* — Jason Y Ko (74) *Attorney, Agent, or Firm* — McGarry Bair PC (57) ABSTRACT

A household appliance includes a cabinet defining an interior, a tub located within the interior, and a basket located within the tub and having a loading opening confronting the tub opening. The appliance also includes a bulk dispenser with a dispensing opening, a first chamber in fluid communication with the dispensing opening, and a second chamber fluidly coupled to the first chamber.

20 Claims, 8 Drawing Sheets

(56) References Cited

U.S. PATENT DOCUMENTS

| | | |
|---|---|---|
| 8,171,757 B2 | 5/2012 | Dahlke |
| 2009/0293556 A1* | 12/2009 | Lee .................. D06F 39/022 68/17 R |
| 2011/0139816 A1* | 6/2011 | Kessler ............ A47L 15/4454 134/93 |
| 2011/0174344 A1 | 7/2011 | Cerruti et al. |

\* cited by examiner

HOUSEHOLD APPLIANCE WITH A BULK DISPENSER

BACKGROUND

Laundry treating household appliances, such as washing machines, refreshers, and non-aqueous systems, can have a configuration based on a rotating drum that at least partially defines a treating chamber in which laundry items are placed for treating. The laundry treating household appliance can have a controller that implements a number of user-selectable, pre-programmed cycles of operation having one or more operating parameters. Hot water, cold water, or a mixture thereof, along with various treating chemistries, can be supplied to the treating chamber in accordance with the cycle of operation. The laundry treating household appliance can have a dispenser for loading of treating chemistries into the appliance by the user and for supplying various treating chemistries to the treating chamber.

BRIEF SUMMARY

In one aspect, a household appliance includes a cabinet defining an interior and having a wall defining an access opening, a cover movable relative to the cabinet between opened and closed positions to selectively close the access opening, and a tub located within the interior and defining a tub opening confronting the access opening. A basket can be located within the tub and have an edge defining a loading opening that confronts the tub opening and the access opening. The household appliance can also include a manually operable bulk dispenser having a dispensing opening, a first chamber in fluid communication with the dispensing opening and moveable between a dispensing position and a filling position, a biasing element biasing the first chamber toward the dispensing position, and a second chamber fluidly coupled to the first chamber when the first chamber is in the filling position.

In another aspect, a manually operable bulk dispenser includes a dispensing opening, a first chamber in fluid communication with the dispensing opening and moveable between a dispensing position and a filling position, a biasing element biasing the first chamber toward the dispensing position, and a second chamber fluidly coupled to the first chamber when the first chamber is in the filling position.

In yet another aspect, a method of manually operating a bulk dispenser in a laundry treating appliance having a dispensing opening and a first chamber in fluid communication with the dispensing opening includes manually moving the first chamber between a dispensing position and a filling position, filling the first chamber with treating chemistry when the first chamber is in a filling position, biasing the first chamber to the dispensing position, and dispensing treating chemistry from the first chamber through the dispensing opening when the first chamber is in the dispensing position.

DETAILED DESCRIPTION

Figure 1:
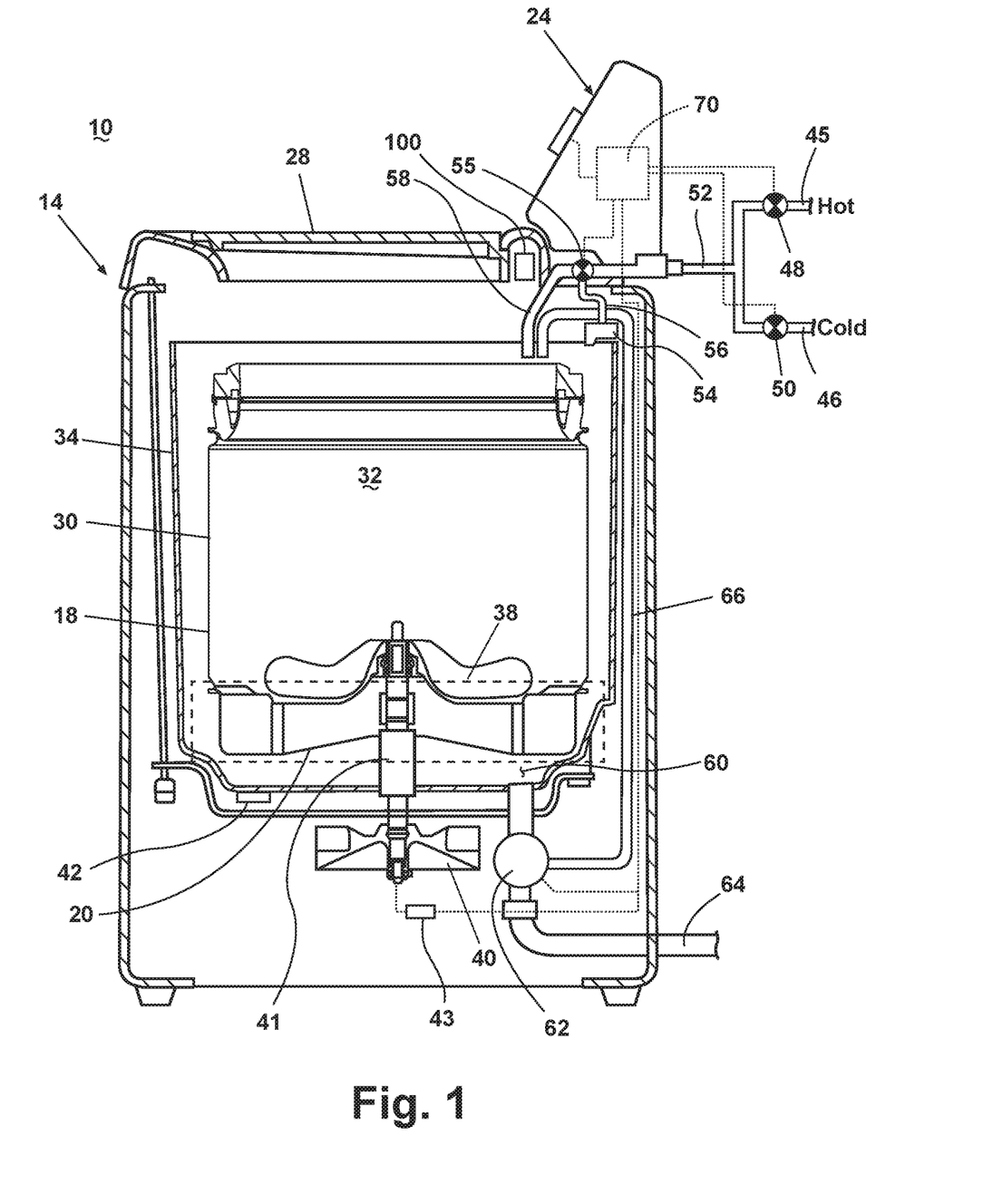
FIG. 1 is a schematic view of an exemplary household appliance in the form of a washing machine including a treating chemistry dispenser according to various aspects described herein.

Laundry treating household appliances can be provided with treating chemistry dispensers. Such treating chemistry dispensers can have a plurality of reservoirs for containing different types of treating chemistries, non-limiting examples of which include a detergent, a fabric softener, or a bleaching agent. By way of overview, FIG. 1 is illustrative of an example of a laundry treating appliance in the form of a washing machine that includes a structural support system, drive system, liquid supply system, recirculation and drain system, and dispensing system. The structural support system can include a cabinet, tub, and basket rotatably mounted within the tub for receipt of laundry items. An exemplary treating chemistry dispenser can be utilized within the laundry treating appliance, and can include a first, or bulk, chamber fluidly coupled to a second, or single-use, chamber which can be filled via the first chamber by pressing on the single-use chamber. FIGS. 3-8 are illustrative of various aspects of the exemplary treating chemistry dispenser of FIG. 1, including that the single-use chamber, or any chamber within the treating chemistry dispenser, can be filled by gravity or siphoning, and that a metering pump can be utilized to provide a fixed amount of treating chemistry into the single-use chamber from the bulk chamber as desired.

In more detail, and referring again to FIG. 1, a schematic sectional view of a laundry treating appliance in the form of a washing machine 10 is illustrated according to one embodiment of the invention. The laundry treating appliance is illustrated as a vertical axis, top-fill washing machine; it will be understood that aspects of the present disclosure can have applicability in other fabric treating appliances, non-limiting examples of which include a combination washing machine and dryer, a refreshing/revitalizing machine, an extractor, or a non-aqueous washing apparatus. It is further contemplated that aspects of the disclosure can have applicability in other household appliances to perform a cleaning or refreshing cycle, including dish washing appliances.

The washing machine 10 can include a structural support system comprising a cabinet 14 that defines a housing, within which a laundry holding system resides. The cabinet 14 can be a housing having a chassis and/or a frame, to which decorative panels may or may not be mounted, defining an interior that receives components typically found in a conventional washing machine, such as motors, pumps, fluid lines, controls, sensors, transducers, and the like. Such components will not be described further herein except as necessary for a complete understanding of the invention.

A user interface 24 may be included on the cabinet 14 and may have one or more knobs, dials, switches, displays, touch screens and the like for communicating with the user, such as to receive input and provide output. The user can enter different types of information including, without limitation, cycle selection and cycle parameters, such as cycle options.

A door or lid 28 may be operably coupled with the cabinet 14 and may be selectively moveable between opened and closed positions to close an opening in a top wall of the cabinet 14, which provides access to the interior of the cabinet 14.

The fabric holding system of the illustrated exemplary washing machine 10 can include a rotatable basket 30 having an open top that can be disposed within the interior of the cabinet 14 and may define a treating chamber 32 for receiving laundry items for treatment. The basket 30 can have a generally cylindrical side or tub peripheral wall 18 closed at its bottom end by a basket bottom wall 20 that can at least partially define a sump 60 and the treating chamber 32. An imperforate tub 34 can also be positioned within the cabinet 14 and can define an interior within which the basket 30 can be positioned.

The basket 30 can be rotatably mounted within the tub 34 for rotation about a vertical basket axis of rotation and can include a plurality of perforations, such that liquid may flow between the tub 34 and the rotatable basket 30 through the perforations.

A laundry mover 38 may be rotatably mounted within the basket 30 to impart mechanical agitation to a load of laundry placed in the basket 30. The laundry mover 38 can be oscillated or rotated about its vertical axis of rotation during a cycle of operation in order to produce load motion effective to wash the load contained within the treating chamber 32. Other exemplary types of laundry movers include, but are not limited to, an agitator, a wobble plate, and a hybrid impeller/agitator. The basket 30 and the laundry mover 38 may be driven by a drive system 40 that includes a motor 41 operably coupled with the basket 30 and laundry mover 38. The motor 41 can rotate the basket 30 at various speeds in either rotational direction about the vertical axis of rotation, including at a spin speed wherein a centrifugal force at the inner surface of the basket side wall 18 is 1 g or greater. Spin speeds are commonly known for use in extracting liquid from the laundry items in the basket 30, such as after a wash or rinse step in a treating cycle of operation. A loss motion device or clutch (not shown) can be included in the drive system 40 and can selectively operably couple the motor 41 with either the basket 30 and/or the laundry mover 38.

A liquid supply system can be provided to supply liquid, such as water or a combination of water and one or more wash aids, such as detergent, into the treating chamber 32. The liquid supply system can include a water supply configured to supply hot or cold water. The water supply can include a hot water inlet 45 and a cold water inlet 46, a valve assembly, which can include a hot water valve 48, a cold water valve 50, and a diverter valve 55, and various conduits 52, 56, 58. The valves 48, 50 are selectively openable to provide water, such as from a household water supply (not shown) to the conduit 52. The valves 48, 50 can be opened individually or together to provide a mix of hot and cold water at a selected temperature. While the valves 48, 50 and conduit 52 are illustrated exteriorly of the cabinet 14, it may be understood that these components can be internal to the cabinet 14.

As illustrated, a detergent dispenser 54 can be fluidly coupled with the conduit 52 through a diverter valve 55 and a first water conduit 56. The detergent dispenser 54 can include means for supplying or mixing detergent to or with water from the first water conduit 56 and can supply such treating liquid to the tub 34. It has been contemplated that water from the first water conduit 56 can also be supplied to the tub 34 through the detergent dispenser 54 without the addition of a detergent. A second water conduit, illustrated as a separate water inlet 58, can also be fluidly coupled with the conduit 52 through the diverter valve 55 such that water can be supplied directly to the treating chamber through the open top of the basket 30. Additionally, the liquid supply system can differ from the configuration shown, such as by inclusion of other valves, conduits, wash aid dispensers, heaters, sensors, such as water level sensors and temperature sensors, and the like, to control the flow of treating liquid through the washing machine 10 and for the introduction of more than one type of detergent/wash aid.

The washing machine 10 may also be provided with a dispensing system for dispensing treating chemistry to the treating chamber 32 or tub 34 for use in treating the laundry according to a cycle of operation. The dispensing system can include a manually operable bulk dispenser 100 which will be described in further detail below. The bulk dispenser 100 can store at least one dose of treating chemistry that can be dispensed to the treating chamber 32 or the tub 34; the dispenser 100 may also include a dispenser siphon or suction pipe (not shown) for aiding the supply of chemistry to a desired location.

As used herein, "chemistry" or "treating chemistry" may refer to any type of aid for treating fabric, non-limiting examples of which include washing aids such as detergents, oxidizers, or bleaches, and additives such as water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, or any combination thereof.

The bulk dispenser 100 may be provided on an exterior of the cabinet 14 and immediately accessible by the user, or hidden behind a cover such as a drawer or access panel. As illustrated, the bulk dispenser 100 may be disposed behind the lid 28 and underneath the user interface 24. It is also contemplated that the bulk dispenser 100 may be slidably attached to the cabinet 14, such as in a drawer-based dispensing system (not illustrated).

A liquid recirculation system can be provided for recirculating liquid from the tub 34 into the treating chamber 32. More specifically, a sump 60 can be located in the bottom of the tub 34 and the liquid recirculation system can be configured to recirculate treating liquid from the sump 60 onto the top of a laundry load located in the treating chamber 32. A pump 62 can be housed below the tub 34 and can have an inlet fluidly coupled with the sump 60 and an outlet configured to fluidly couple to either or both a household drain 64 or a recirculation conduit 66. In this configuration, the pump 62 can be used to drain or recirculate wash water in the sump 60. As illustrated, the recirculation conduit 66 can be fluidly coupled with the treating chamber 32 such that it supplies liquid into the open top of the basket 30. The liquid recirculation system can include other types of recirculation systems.

It is noted that the illustrated drive system, liquid supply system, recirculation and drain system, and dispensing system are shown for exemplary purposes only and are not limited to the systems shown in the drawings and described above. For example, the liquid supply, dispensing, and recirculation and pump systems can differ from the configuration shown in FIG. 1, such as by inclusion of other valves, conduits, treating chemistry dispensers, sensors (such as liquid level sensors and temperature sensors), and the like, to control the flow of liquid through the washing machine 10 and for the introduction of more than one type of treating chemistry. For example, the liquid supply system and/or the dispensing system can be configured to supply liquid into the interior of the tub 34 not occupied by the basket 30 such that liquid can be supplied directly to the tub 34 without having to travel through the basket 30. In another example, the liquid supply system can include a single valve for controlling the flow of water from the household water source. In yet another example, the recirculation and pump system can include two separate pumps for recirculation and draining, instead of the single pump as previously described.

The washing machine 10 can also be provided with a heating system (not shown) to heat liquid provided to the treating chamber 32. In one example, the heating system can include a heating element provided in the sump to heat liquid that collects in the sump. Alternatively, the heating system can be in the form of an in-line heater that heats the liquid as it flows through the liquid supply, dispensing and/or recirculation systems.

The washing machine 10 can further include a controller 70 coupled with various working components of the washing machine 10 to control the operation of the working components and to implement one or more treating cycles of operation. The controller 70 can include the machine controller and any additional controllers provided for controlling any of the components of the washing machine 10. For example, the controller 70 can include the machine controller and a motor controller. Many known types of controllers can be used for the controller 70. It is contemplated that the controller is a microprocessor-based controller that implements control software and sends/receives one or more electrical signals to/from each of the various working components to implement the control software. As an example, proportional control (P), proportional integral control (PI), and proportional derivative control (PD), or a combination thereof such as a proportional integral derivative control (PID), can be used to control the various components of the washing machine 10.

Figure 2:
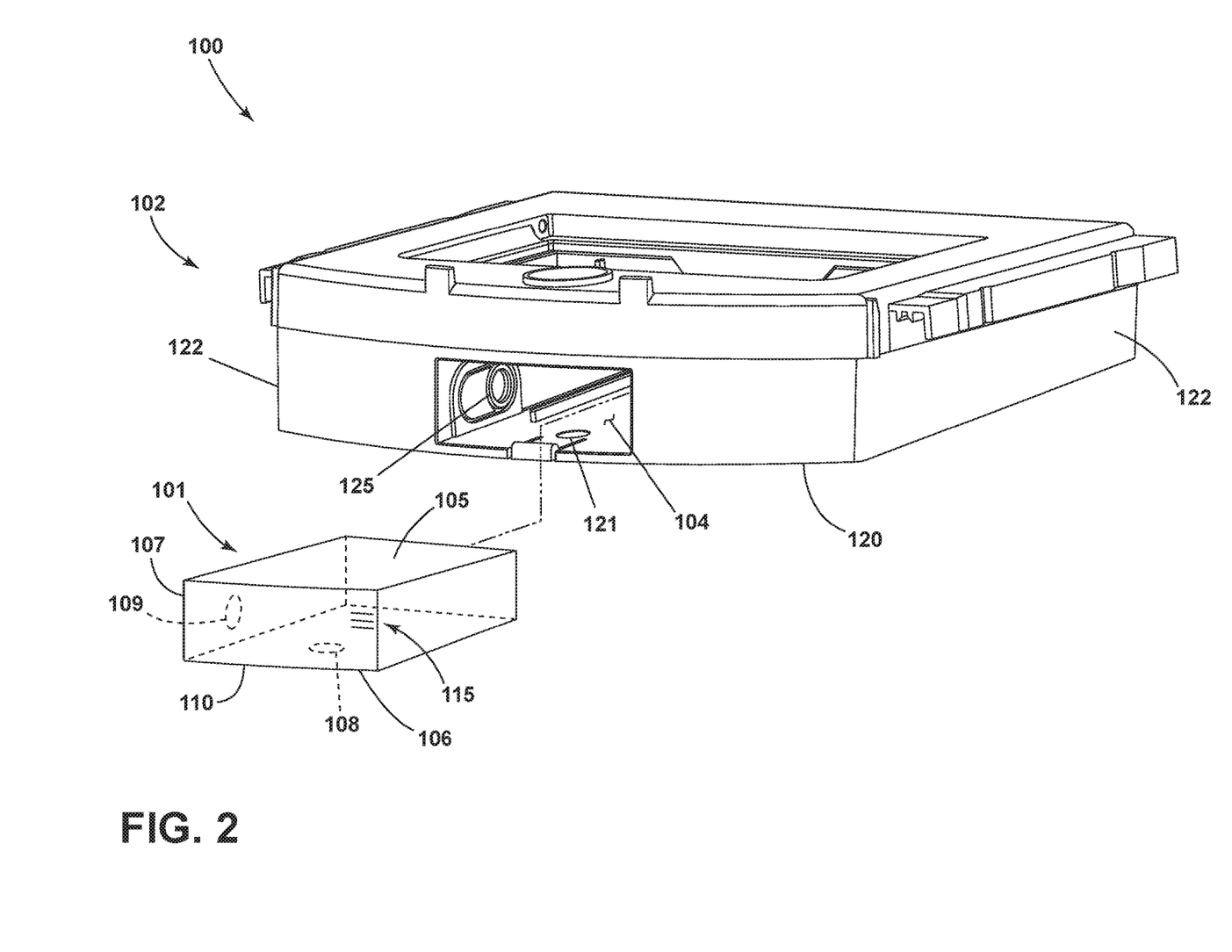
FIG. 2 is a partially exploded view of the treating chemistry dispenser of FIG. 1 according to a first embodiment.

Referring now to FIG. 2, the manually operable bulk dispenser 100 can include a first chamber 101 and a second chamber 102 having a recess 104, where the first chamber 101 can be slidably received as shown.

The first chamber 101 can include a top wall 105, a bottom wall 106, and a set of side walls 107, as well as a bottom opening 108 in the bottom wall 106 and a side opening 109 in one of the side walls 107 as shown. It is contemplated that the bottom wall 106 can be formed with a non-horizontal, downward sloping surface, in which case the bottom opening 108 can be positioned at or near a lower end of the downward sloping bottom wall 106. In addition, one of the side walls 107 can define a pressing portion 110; for example, a user may selectively exert a force F on the first chamber 101 by manually pressing on the pressing portion 110 as desired. It should be understood that the side opening 109 can also include a sealing element (not shown), including O-rings or other elastic members as desired.

Any or all of the top wall 105, bottom wall 106, or side walls 107 can be made of a transparent material including plastic, or include a transparent portion made of a transparent material. At least one liquid fill level 115 can be included on a desired side wall 107 as shown, such as with a printed mark or contour in the side wall 107, and it may be possible to view the liquid fill level 115 through one of the transparent walls as desired. In one non-limiting example, a back wall 107 can include the liquid fill level 115 which may be viewed through a transparent front wall 107. In another example, a transparent front wall 107 can include the liquid fill level 115 while other side walls 107 include opaque materials. In yet another example, all walls 105, 106, 107 can include a transparent material such that the first chamber 101 can be entirely transparent. Furthermore, a plurality of liquid fill levels 115 can be provided in the first chamber 101, including one level for each of a small, medium, and large wash load, or providing liquid fill levels 115 on multiple side walls 107 to aid in visibility during filling. Other examples are contemplated for use in the first chamber 101.

The second chamber can include a lower surface 120 having a dispensing opening 121, and a set of side surfaces 122, where at least one of the side surfaces 122 can include a filling opening 125 as shown. It should also be appreciated that the dispensing opening 121 can include a sealing element (not shown), including O-rings, to selectively allow fluid flow through the dispensing opening 121. When assembled, the bottom opening 108 of the first chamber 101 can align with the dispensing opening 121 of the second chamber 102. Furthermore, the side opening 109 of the first chamber 101 can also align with the filling opening 125 of the second chamber 102 such that the first and second chambers 101, 102 can be fluidly coupled via the filling opening 125. In one example, it is contemplated that the side opening 109 can be unaligned with the filling opening 125 when the bottom opening 108 is aligned with the dispensing opening 121. It should be recognized that while the illustrations in FIGS. 2 & 3 contemplate side openings 109, 125 in the first and second chambers 101, 102, the openings 109, 125 could be in various locations including the top wall of the first chamber 101 without departing from the scope of the disclosure.

It can be appreciated that while the bulk dispenser 100 is illustrated herein as a first chamber 101 disposed in the recess 104 of a second chamber 102, the recess 104 itself may define the first chamber 101. In such an example, the filling opening 125 can fluidly couple the first and second chambers 101, 102 in a wall dividing the two chambers 101, 102, and a valve, flap, or other means can be used to selectively obstruct the filling opening 125 or dispensing opening 121. Other examples in the spirit of the present disclosure are contemplated for use in the bulk dispenser 100.

Figure 3:
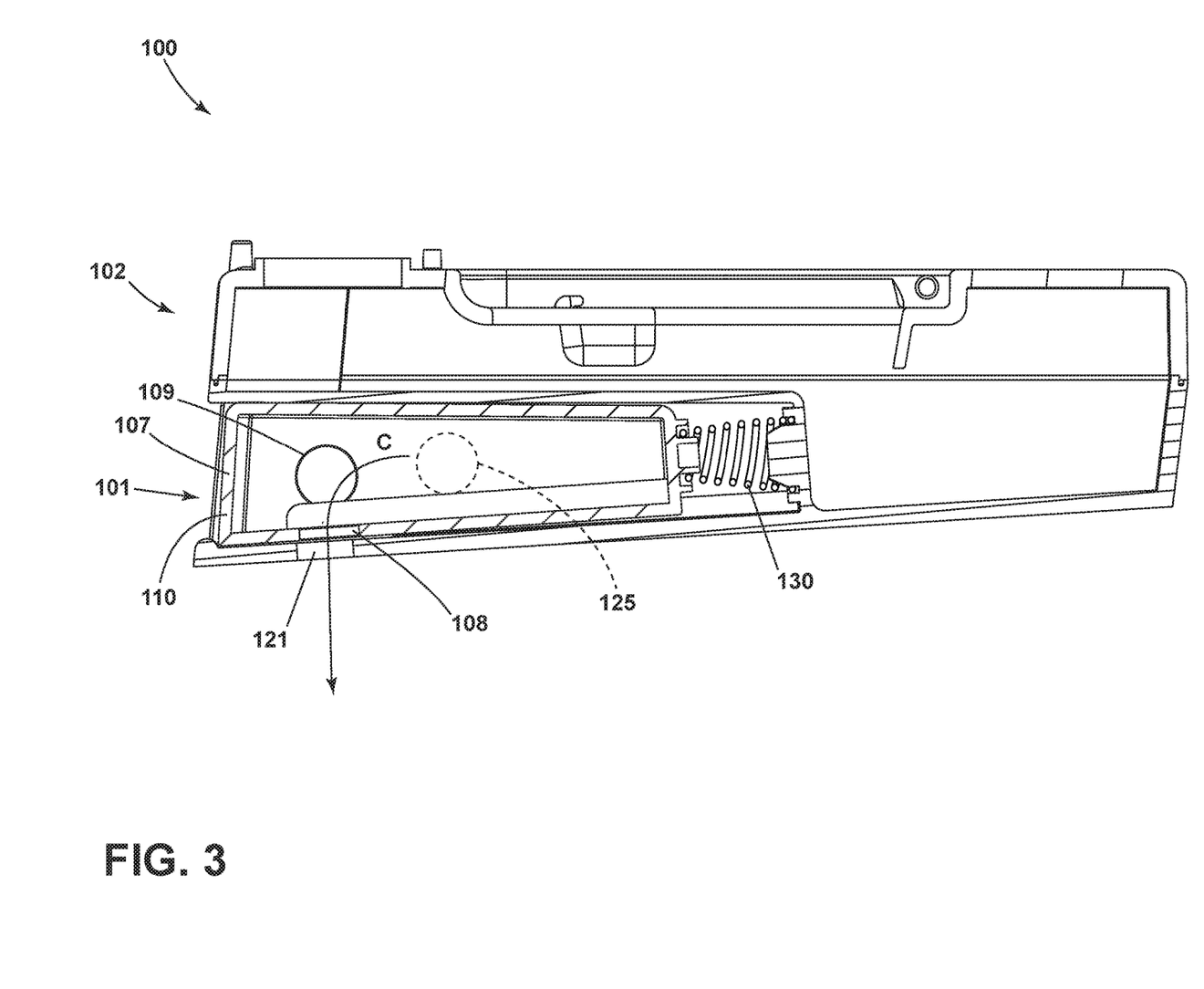
FIG. 3 is a cross-sectional view of the dispenser of FIG. 2 in a first configuration.

FIG. 3 illustrates the assembled bulk dispenser 100 where the first chamber 101 is in a dispensing position. In this illustration it can be seen that a biasing element 130 such as a spring can be positioned between the first chamber 101 and second chamber 102 opposite the pressing portion 110 as shown. It can be appreciated that the biasing element 130 can exert a force on the first chamber 101 to bias the chamber 101 toward the dispensing position, including in the absence of any externally applied forces on the first chamber 101. The biasing element 130 can include any suitable component to exert a biasing force, including a spring, a compressible plastic, rubber, elastic, or foam material, including polymer or ceramic lattices.

While in the dispensing position as in the example of FIG. 3, the side opening 109 of the first chamber 101 is unaligned with the filling opening 125 of the second chamber 102. In addition, the bottom opening 108 of the first chamber 101 is aligned with the dispensing opening 121 as shown. In this manner, treating chemistry or liquids contained in the first chamber 101 can be dispensed via the opening 121 while the chamber 101 is in the dispensing position.

Figure 4:
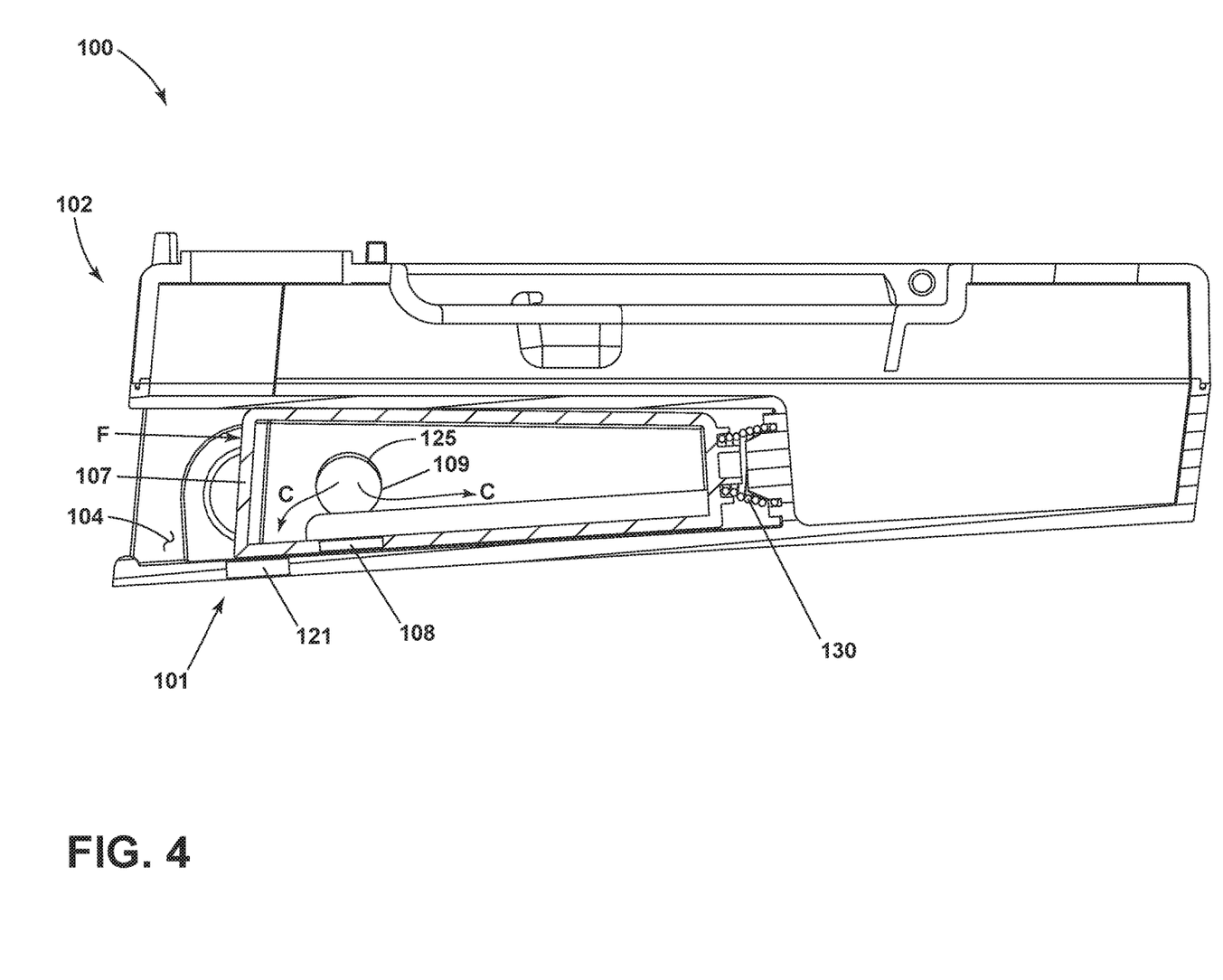
FIG. 4 is a cross-sectional view of the dispenser of FIG. 2 in a second configuration.

It can be appreciated that an applied force F on the pressing portion 110 can act to compress the biasing element 130 and move the first chamber 101 further into the recess 104 as shown in FIG. 4. In this position, the first chamber 100 of the assembled bulk dispenser is in a filling position.

The side opening 109 of the first chamber 101 can be aligned with the filling opening 125 of the second chamber 102, and the bottom opening 108 of the first chamber can be unaligned with the dispensing opening 121. In this manner, the bottom wall 106 can obstruct the dispensing opening 121 while the first chamber 101 is in the filling position.

In operation, the biasing element 130 can exert a biasing force on the first chamber 101 toward the dispensing position (FIG. 3). An external force F, such as that provided by a user pressing on the pressing portion 110, can cause the first chamber 101 to move toward the filling position (FIG. 4). In this position, treating chemistry C can flow from the second chamber 102 to the first chamber 101 by flowing through the filling opening 125 and side opening 109 as shown in FIG. 4, while the obstructed dispensing opening 121 can prevent treating chemistry from leaking out of the second chamber 102 during filling. The transparent wall 107 can allow for visual monitoring of the amount of treating chemistry within the first chamber 101; furthermore, the liquid fill level(s) 115 indicated on the side wall 107 can provide information regarding the measurement or dosage of treating chemistry within the first chamber 101.

When a desired amount of treating chemistry has been filled from the second chamber 102 into the first chamber 101, the external force F can be removed (e.g. a user can cease pressing on the pressing portion 110) and the biasing element 130 can return the first chamber 101 to the dispensing position (FIG. 3). In this position, the obstructed filling opening 125 can prevent any further addition of treating chemistry from the second chamber 102 into the first chamber 101, while the treating chemistry C can be dispensed into the treating chamber 32 or the tub 34 (FIG. 1) by flowing through the bottom opening 108 and dispensing opening 121.

Figure 5:
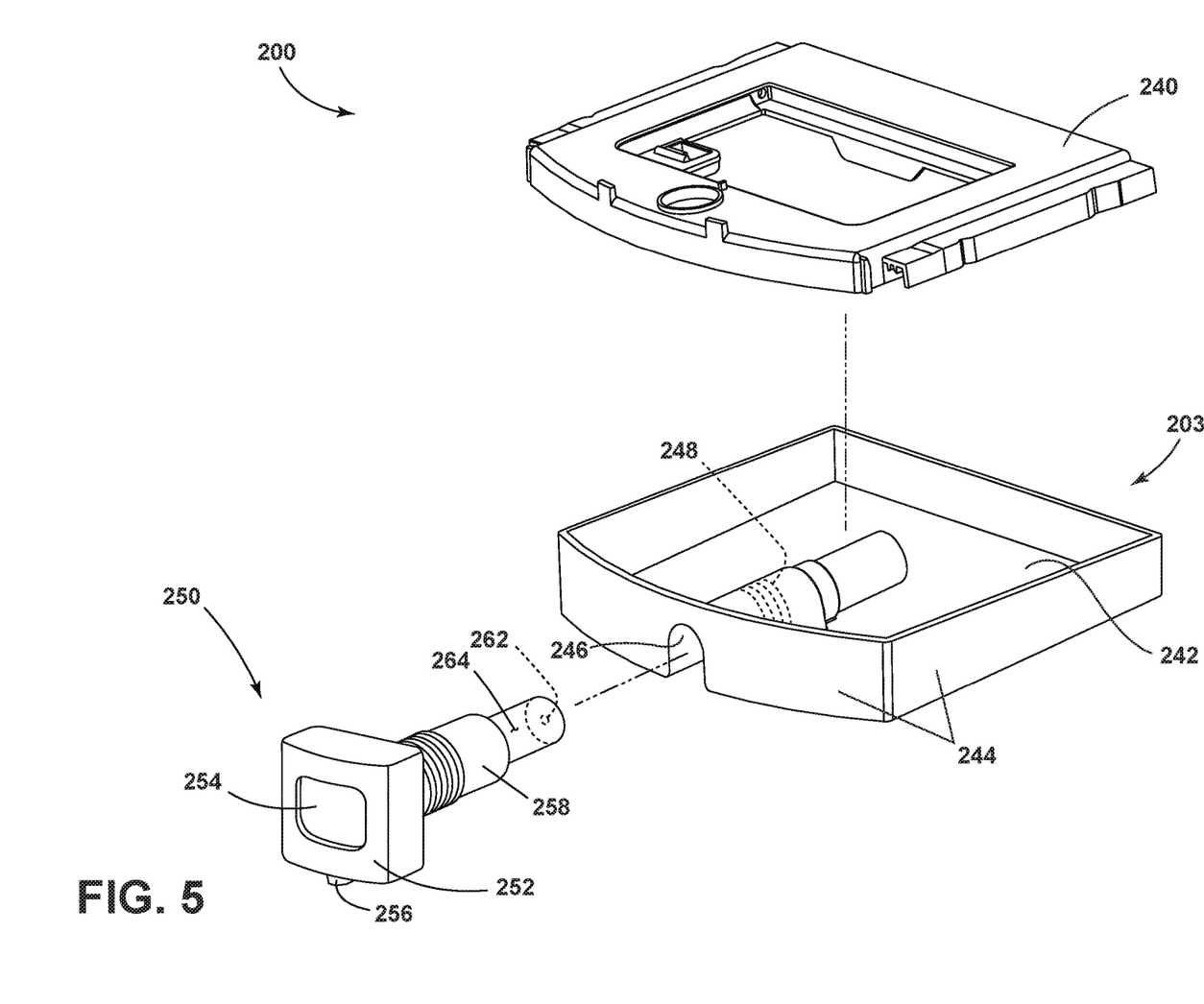
FIG. 5 is a partially exploded view of the treating chemistry dispenser of FIG. 1 according to a second embodiment.

Turning to FIG. 5, another manually operable bulk dispenser 200 is illustrated which can be utilized in the washing machine 10 of FIG. 1. The bulk dispenser 200 is similar to the bulk dispenser 100; therefore, like parts will be identified with like numerals increased by 100, with it being understood that the description of the like parts of the bulk dispenser 100 applies to the bulk dispenser 200, unless otherwise noted.

The bulk dispenser 200 includes a chamber 203 which can store at least one dose of treating chemistry. The chamber 203 can include a top surface 240, bottom surface 242, side walls 244, and a cylindrical recess 246 having internal threading 248. It is also contemplated that any suitable coupling method may be utilized in the cylindrical recess 246, including use of an interference fit or compression sleeves in non-limiting examples.

A dosing pump 250 can also be included in the bulk dispenser 200. The dosing pump 250 can include a front portion 252 with an actuator 254 and a nozzle 256, a cylindrical portion 258 having external threading 260, and an intake port 262 as shown. The dosing pump 250 can have a hollow interior 264 fluidly coupled to the intake port 262 and the nozzle 256. In addition, the dosing pump 250 can include a biasing element 230, which may include a rubber O-ring seal or internal spring (not shown).

Figure 6:
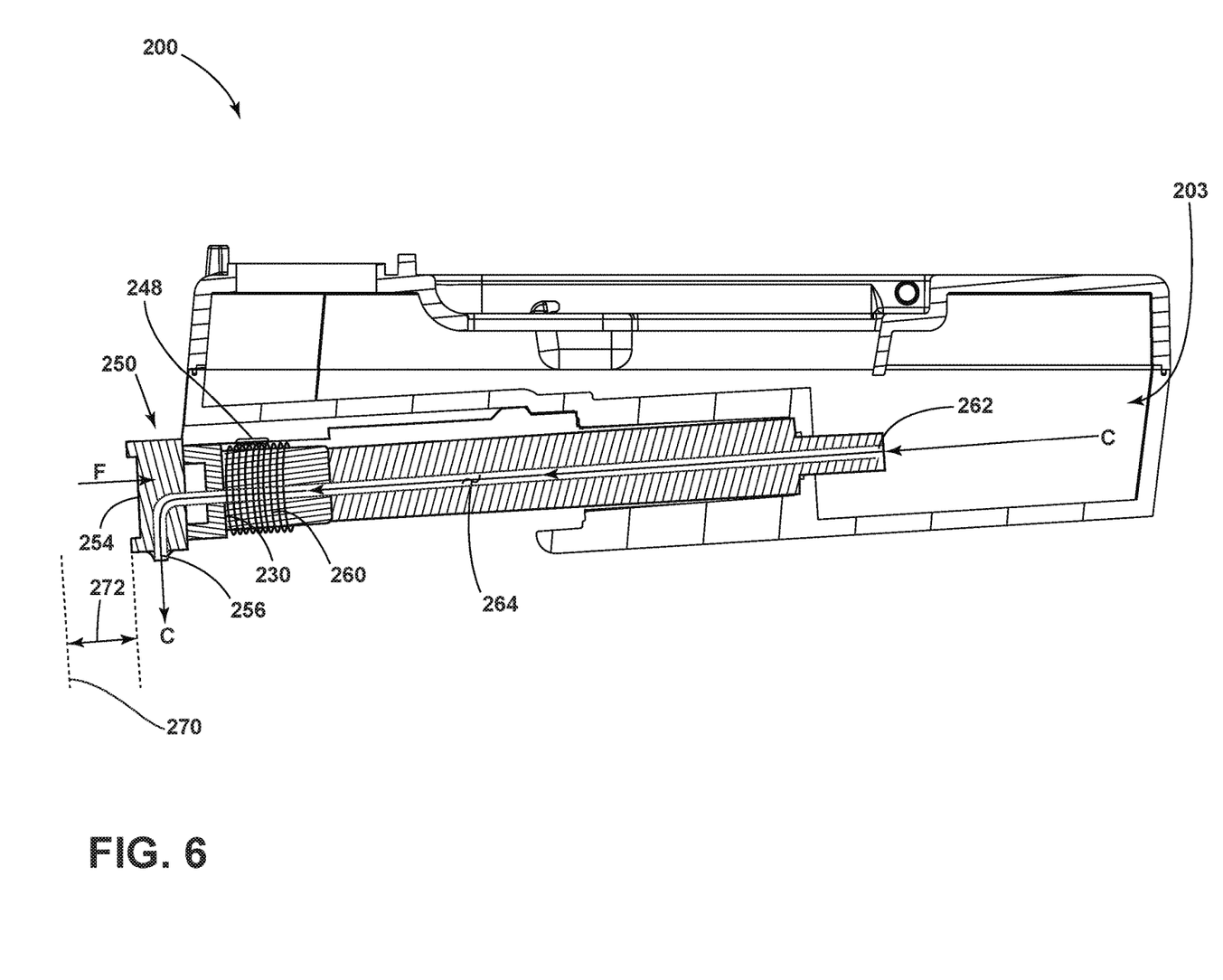
FIG. 6 is a cross-sectional view of the dispenser of FIG. 5.

FIG. 6 illustrates the assembled bulk dispenser 200, where the dosing pump 250 can be threaded into the cylindrical recess 246 via the internal and external threading 248, 260 (FIG. 5). The nozzle 256 can be positioned outside the chamber 203 in an initial position 270 as shown, and can also be fluidly coupled to the chamber 203 via the intake port 262 and hollow interior 264 of the dosing pump 250.

In operation, an externally applied force F (e.g. a user manually pressing on the actuator 254) can cause the biasing element 230 to compress. Fluid forces within the hollow interior 264 can cause treating chemistry to be suctioned from the chamber 203 to the nozzle 256, thereby dispensing a metered dose of treating chemistry from the dispenser 200 into the treating chamber 32 or tub 34 (FIG. 1). It can be appreciated that the actuator 254 can have a fixed amount of travel distance 272, and that treating chemistry may cease to flow from the nozzle 256 when the actuator has moved through its entire travel distance 272. Removal of the external force F (e.g. ceasing pressing on the actuator 254) can cause the biasing element 230 to decompress and the actuator to return to its initial position 270; fluid forces can cause treating chemistry to fill the hollow interior 264 and be stored therein until the external force F is again applied to the actuator 254.

Figure 7:
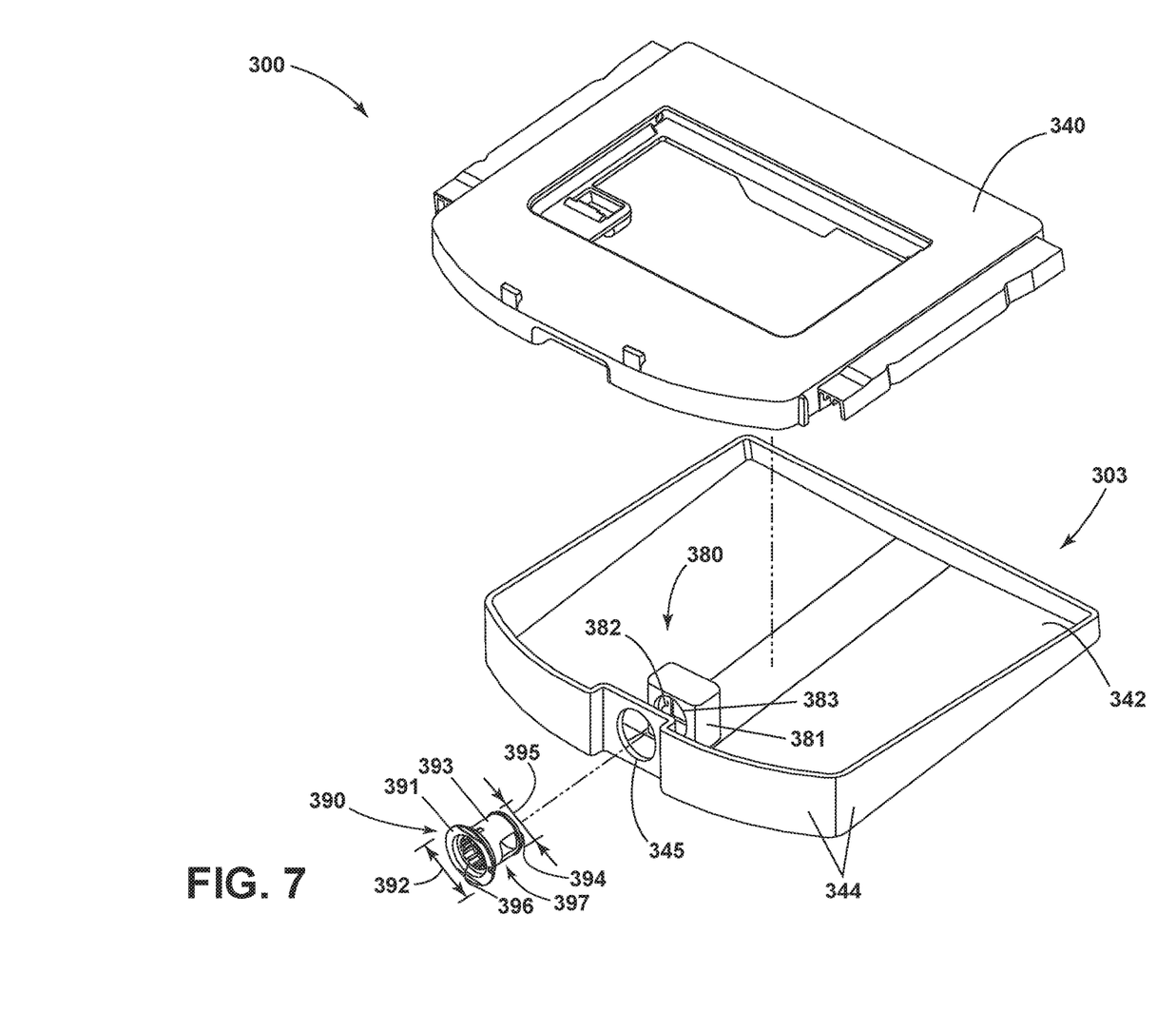
FIG. 7 is a partially exploded view of the treating chemistry dispenser of FIG. 1 according to a third embodiment.

Referring now to FIG. 7, another manually operable bulk dispenser 300 is illustrated which can be utilized in the washing machine 10 of FIG. 1. The bulk dispenser 300 is similar to the bulk dispenser 100; therefore, like parts will be identified with like numerals further increased by 100, with it being understood that the description of the like parts of the bulk dispenser 100 applies to the bulk dispenser 300, unless otherwise noted.

The bulk dispenser 300 can include a chamber 303 with a top surface 340, side walls 344, and a bottom surface 342. The bottom surface 342 can include a projecting portion 380 with a set of vertical walls 381 defining a cavity 382, where at least one vertical wall 381 can include an inner aperture 383 to the cavity 382 as shown. In addition, one of the side walls 344 (illustrated as a front wall) can include an outer aperture 345 in registry with the inner aperture 383.

A valve 390 can be included in the bulk dispenser 300. A variety of valve types can be utilized in the dispenser 300, and in the example of FIG. 7 the valve 390 includes a front portion 391 having a first diameter 392, a rear portion 393 having a second diameter 394 less than the first diameter 392, and a back plate 395 coupled to the rear portion 393. The front portion 391 can include a front opening 396, and the rear portion 393 can include at least one side opening 397 as shown.

Figure 8:
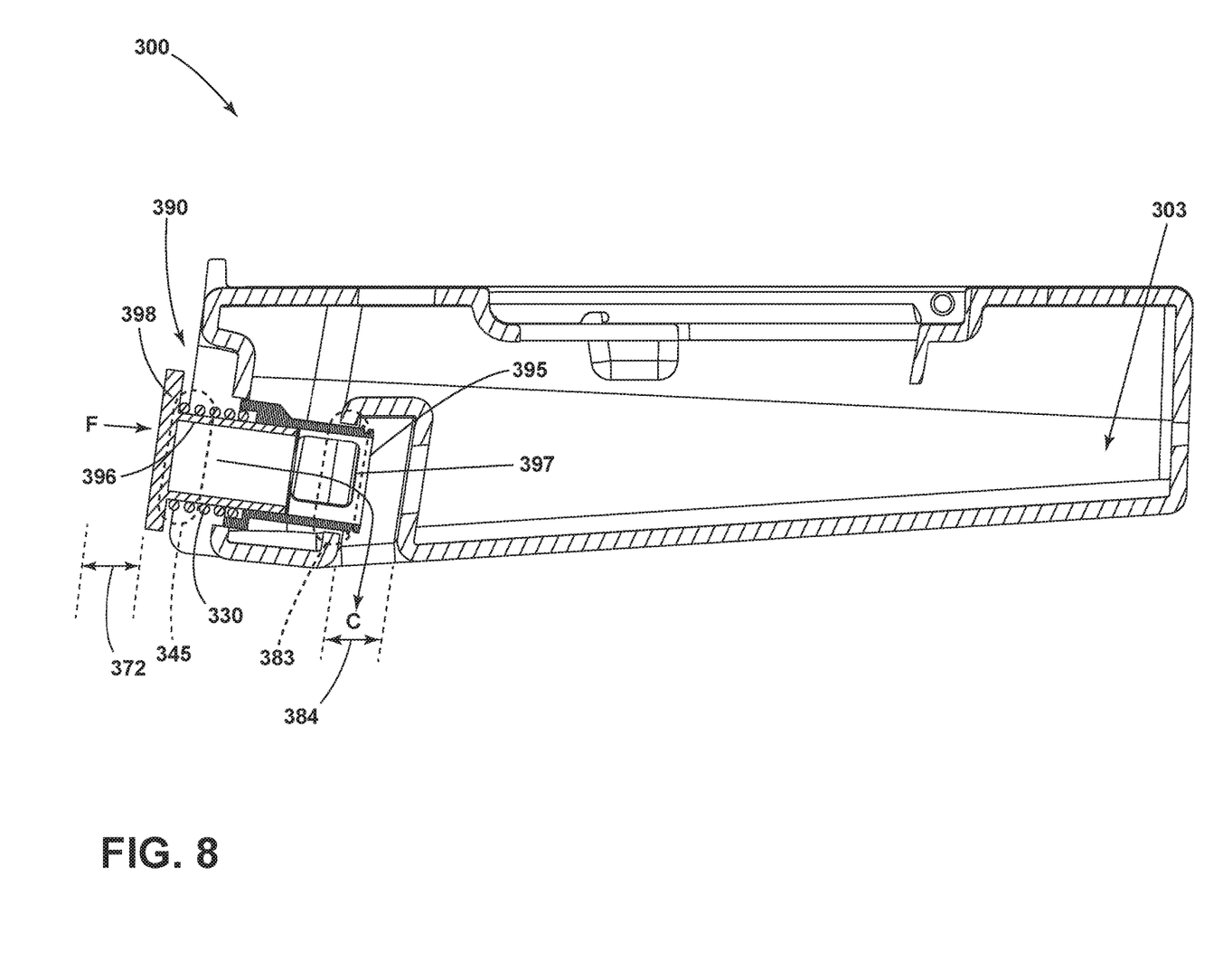
FIG. 8 is a cross-sectional view of the dispenser of FIG. 7.

FIG. 8 illustrates the assembled manual bulk dispenser 300. The valve 390 can be inserted through the outer aperture 345 such that the back plate 395 seals and obstructs the inner aperture 383. A sealing system can also be used (e.g. an O-ring). The valve 390 can further include a biasing element 330 (illustrated as a spring) inserted at least partially into the front opening 396, and a pressing plate 398 can be coupled to the front opening 396. An applied force F can cause the pressing plate 398 and valve 390 to move through a travel distance 372, shifting the back plate 395 and at least a portion of the side opening 397 through the inner aperture 383 and into the cavity 382. It is contemplated that the travel distance 372 can be equal to or less than a width 384 of the cavity 382, including 1 cm in a non-limiting example. While the side opening 397 is at least partially within the cavity 382, treating chemistry C can flow from the chamber 303 through the side opening 397 and into the cavity 382, where it can then flow into the treating chamber 32 or the tub 34 (FIG. 1). Upon removal of the applied force F, the biasing element 330 can reposition the valve 390 such that the back plate 395 obstructs the inner aperture 383 and prevents treating chemistry from flowing out of the chamber 303.

Aspects of the present disclosure provide for a method of manually operating the bulk dispenser 100 in a laundry treating appliance, including the washing machine 10 of FIG. 1, where the bulk dispenser 100 includes the dispensing opening 121 and the first chamber 101 in fluid communication with the dispensing opening 121 (FIG. 2). The method can include manually moving the first chamber 101 between the dispensing position, as illustrated in FIG. 3, and the filling position, as illustrated in FIG. 4. The first chamber is filled with treating chemistry when the first chamber is in the filling position as shown in the example of FIG. 4, the biasing element 130 biases the first chamber 101 to the dispensing position, and treating chemistry is dispensed from the first chamber 101 through the dispensing opening 121 when the first chamber is in the dispensing position as illustrated in FIG. 3. Filling the first chamber can be accomplished via a filling hole, including the filling opening 125, which is fluidly coupled to the second chamber 102 containing treating chemistry as in the example of FIG. 4.

It can be appreciated that the use of manual operation of a bulk treating chemistry dispenser can provide for reduced cost and complexity, and increased durability or part lifetimes, as compared to systems with automated or motorized components. In addition, dosing feedback can be provided to a user through use of liquid fill levels or indicator markings on the chamber to indicate when to cease filling the chamber with treating chemistry. In this manner it is possible to provide the convenience of a bulk storage chamber with reduced costs in manufacturing or assembly of the laundry treating appliance.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention, which is defined in the appended claims.

What is claimed is:

1. A household appliance comprising:
   a cabinet defining an interior and having a wall defining an access opening;
   a cover movable relative to the cabinet between opened and closed positions to selectively close the access opening;
   a tub located within the interior and defining a tub opening confronting the access opening;
   a basket located within the tub and having an edge defining a loading opening confronting the tub opening and the access opening;
   a manually operable bulk dispenser comprising:
      a dispensing opening;
      a first chamber accessible from an exterior of the cabinet and in fluid communication with the dispensing opening and manualy moveable between a dispensing position and a filling position;
      a biasing element biasing the first chamber toward the dispensing position; and
      a second chamber located within the interior of the cabinet and fluidly coupled to the first chamber when the first chamber is in the filling position.

2. The household appliance of claim 1 further comprising an aperture located in the first chamber, wherein the aperture aligns with the dispensing opening when the first chamber is in the dispensing position.

3. The household appliance of claim 2 wherein a portion of the first chamber blocks the dispensing opening when the first chamber is in the filling position.

4. The household appliance of claim 1 further comprising a downward sloping bottom wall defining a portion of the first chamber.

5. The household appliance of claim 4 wherein the dispensing opening is located at a lower end of the downward sloping bottom wall.

6. The household appliance of claim 5 wherein the dispensing opening is located above the basket to allow dispensing liquid to feed into the tub by gravity when the first chamber is in the dispensing position.

7. The household appliance of claim 1 wherein the first and second chambers are fluidly coupled by a filling opening in a wall of the second chamber.

8. The household appliance of claim 7 wherein the filling opening is obstructed by the first chamber when the first chamber is in the dispensing position.

9. The household appliance of claim 8 wherein the second chamber is located above the first chamber to allow dispensing liquid to feed into the first chamber by gravity when the first chamber is in the filling position.

10. The household appliance of claim 1 wherein the first chamber comprises a transparent portion to allow a user to see a liquid fill level.

11. The household appliance of claim 10 wherein the transparent portion of the first chamber is a sidewall.

12. The household appliance of claim 11 wherein the sidewall is marked with at least one liquid fill level.

13. A manually operable bulk dispenser comprising:
   a dispensing opening;
   a first chamber accessible from an exterior of the bulk dispenser and in fluid communication with the dispensing opening and manually moveable between a dispensing position and a filling position;
   a biasing element biasing the first chamber toward the dispensing position; and
   a second chamber fluidly coupled to the first chamber when the first chamber is in the filling position.

14. The bulk dispenser of claim 13 further comprising an aperture located in the first chamber, wherein the aperture aligns with the dispensing opening when the first chamber is in the dispensing position.

15. The bulk dispenser of claim 14 wherein a portion of the first chamber blocks the dispensing opening when the first chamber is in the filling position.

16. The bulk dispenser of claim 13 wherein the first and second chambers are fluidly coupled by a filling opening in a wall of the second chamber.

17. The bulk dispenser of claim 16 wherein the filling opening is obstructed by the first chamber when the first chamber is in the dispensing position.

18. The bulk dispenser of claim 13 wherein the first chamber comprises a transparent portion to allow a user to see a liquid fill level.

19. The bulk dispenser of claim 18 wherein the transparent portion of the first chamber is a sidewall.

20. The bulk dispenser of claim 19 wherein the sidewall is marked with at least one liquid fill level.

* * * * *